United States Patent
Kyung et al.

(10) Patent No.: US 11,382,020 B2
(45) Date of Patent: Jul. 5, 2022

(54) ELECTRONIC DEVICE AND METHOD FOR BEAM FAILURE RECOVERY

(71) Applicant: MEDIATEK SINGAPORE PTE. LTD., Singapore (SG)

(72) Inventors: Gyu Bum Kyung, San Jose, CA (US); Weidong Yang, San Jose, CA (US); Tzu-Han Chou, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 111 days.

(21) Appl. No.: 16/827,140

(22) Filed: Mar. 23, 2020

(65) Prior Publication Data
US 2020/0314724 A1    Oct. 1, 2020

Related U.S. Application Data

(60) Provisional application No. 62/863,948, filed on Jun. 20, 2019, provisional application No. 62/841,908, (Continued)

(51) Int. Cl.
*H04W 36/36* (2009.01)
*H04W 36/30* (2009.01)
(Continued)

(52) U.S. Cl.
CPC .......... *H04W 36/36* (2013.01); *H04W 36/06* (2013.01); *H04W 36/305* (2018.08);
(Continued)

(58) Field of Classification Search
CPC ............. H04W 36/36; H04W 72/1242; H04W 72/1284; H04W 36/305; H04W 72/1268;
(Continued)

(56) References Cited

U.S. PATENT DOCUMENTS

2013/0010711 A1    1/2013    Larsson et al.
2018/0138962 A1    5/2018    Islam et al.
(Continued)

FOREIGN PATENT DOCUMENTS

CN           108809580 A    11/2018
WO    WO 2018/196851 A1    11/2018

OTHER PUBLICATIONS

Shao-hui, S. U. N., et al. "Overview on the progress of design and standardization of the fifth generation of mobile communications system." 41.5 (2018): 26. (Year: 2018).*
(Continued)

*Primary Examiner* — Sharad Rampuria
(74) *Attorney, Agent, or Firm* — Oblon, McClelland, Maier & Neustadt, L.L.P.

(57) ABSTRACT

Aspects of the disclosure provide an electronic device including processing circuitry and a method for beam failure recovery. The processing circuitry can determine whether beam failure occurs on at least one of a plurality of cells configured for serving an electronic device. When the beam failure is determined to occur on the at least one of the plurality of cells, the processing circuitry can send an uplink message that includes a first portion and a second portion to a network. The first portion indicating the beam failure is transmitted using a physical random access channel (PRACH) resource. The second portion indicates at least one of cell information of the at least one of the plurality of cells and new beam information of one or more new candidate beams for the at least one of the plurality of cells and is transmitted using a physical uplink shared channel (PUSCH) resource.

18 Claims, 7 Drawing Sheets

Related U.S. Application Data filed on May 2, 2019, provisional application No. 62/824,458, filed on Mar. 27, 2019.

(51) Int. Cl.
*H04W 72/12* (2009.01)
*H04W 74/08* (2009.01)
*H04W 36/06* (2009.01)

(52) U.S. Cl.
CPC ... *H04W 72/1242* (2013.01); *H04W 72/1268* (2013.01); *H04W 72/1284* (2013.01); *H04W 74/0833* (2013.01)

(58) Field of Classification Search
CPC . H04W 74/0833; H04W 36/06; H04W 16/28; H04W 76/19; H04B 7/0695
See application file for complete search history.

(56) References Cited

U.S. PATENT DOCUMENTS

| | | | |
|---|---|---|---|
| 2018/0279136 A1 | 9/2018 | Tsai et al. | |
| 2018/0323856 A1 | 11/2018 | Xiong et al. | |
| 2019/0037604 A1 | 1/2019 | Akkarakaran et al. | |
| 2020/0007220 A1 | 1/2020 | Xiong et al. | |
| 2020/0092785 A1 | 3/2020 | Yang | |
| 2020/0137821 A1* | 4/2020 | Cirik | H04B 17/327 |
| 2020/0260300 A1* | 8/2020 | Cirik | H04W 24/08 |

OTHER PUBLICATIONS

Lien, Shao-Yu, et al. "5G new radio: Waveform, frame structure, multiple access, and initial access." IEEE communications magazine 55.6 (2017): 64-71. (Year: 2017).*
International Search Report and Written Opinion dated Jul. 1, 2020 in PCT/CN2020/081585, 9 pages.
International Search Report and Written Opinion dated Jul. 3, 2020 in PCT/CN2020/081658, 9 pages.
Huawei, et al., "Beam failure recovery for SCell," 3GPP TSG RAN WG1 Meeting #94bis R1-1810106, Oct. 2018, 6 pages.
Huawei, et al., "Beam failure recovery for Scell," 3GPP TSG RAN WG1 Meeting #95 R1-1813561, Nov. 2018, 7 pages.
MediaTek Inc., "Remaining Issues for Beam Management and Beam Failure Recovery," 3GPP TSG RAN WG1 Meeting #94 R1-1808264, Aug. 2018, 7 pages.
Nec, "Discussion on Beam Failure Recovery," 3GPP TSG RAN WG1 Meeting #95 R1-1812646, Nov. 2018, 2 pages.
Samsung, "Corrections on Beam Failure Recovery," 3GPP TSG RAN WG1 Meeting #92bis R1-1806716, Apr. 2018, 4 pages.
Taiwanese Office Action dated May 27, 2021 in Taiwanese Patent Application No. 109109458, 4 pages.
Combined Taiwanese Office Action and Search Report dated Nov. 19, 2020 in Taiwanese Patent Application No. 109109458 (with English translation of categories of cited documents), 9 pages.
Combined Taiwanese Office Action and Search Report dated Dec. 18, 2020 in Taiwanese Patent Application No. 109110217 (with English translation of categories of cited documents), 9 pages.
Taiwanese Office Action dated Jul. 29, 2021 in Taiwanese Patent Application No. 109110217, 5 pages.
Combined Chinese Office Action and Search Report dated Sep. 7, 2021 in corresponding Chinese Patent Application No. 202080001777.3 (with English Translation of Category of Cited Documents), 7 pages.

* cited by examiner

FIG. 6B

| | | | | | | | |
|---|---|---|---|---|---|---|---|
| R | $C_1$ | $C_2$ | $C_3$ | $C_4$ | $C_5$ | $C_6$ | $C_7$ |
| $C_8$ | $C_9$ | $C_{10}$ | $C_{11}$ | $C_{12}$ | $C_{13}$ | $C_{14}$ | $C_{15}$ |
| $C_{16}$ | $C_{17}$ | $C_{18}$ | $C_{19}$ | $C_{20}$ | $C_{21}$ | $C_{22}$ | $C_{23}$ |
| $C_{24}$ | $C_{25}$ | $C_{26}$ | $C_{27}$ | $C_{28}$ | $C_{29}$ | $C_{30}$ | $C_{31}$ |
| NBI for Serving Cell i | | | | | | R | R |
| NBI for Serving Cell j | | | | | | R | R |
| ... | | | | | | | |
| NBI for Serving Cell k | | | | | | R | R |

| | | | | | | | |
|---|---|---|---|---|---|---|---|
| R | $C_1$ | $C_2$ | $C_3$ | $C_4$ | $C_5$ | $C_6$ | $C_7$ |
| $C_8$ | $C_9$ | $C_{10}$ | $C_{11}$ | $C_{12}$ | $C_{13}$ | $C_{14}$ | $C_{15}$ |
| $C_{16}$ | $C_{17}$ | $C_{18}$ | $C_{19}$ | $C_{20}$ | $C_{21}$ | $C_{22}$ | $C_{23}$ |
| $C_{24}$ | $C_{25}$ | $C_{26}$ | $C_{27}$ | $C_{28}$ | $C_{29}$ | $C_{30}$ | $C_{31}$ |
| NBI for Serving Cell i | | | | | | R | E |
| Corresponding RSRP for new beam index (optional) | | | | | | | R |
| NBI for Serving Cell j | | | | | | R | E |
| Corresponding RSRP for new beam index (optional) | | | | | | | R |
| ... | | | | | | | |
| NBI for Serving Cell k | | | | | | R | E |
| Corresponding RSRP for new beam index (optional) | | | | | | | R |

610/610A, 621, 623, 624, 625

| $c_0$ | $c_1$ | $c_2$ | $c_3$ | $c_4$ | $c_5$ | $c_6$ | $c_7$ |
| --- | --- | --- | --- | --- | --- | --- | --- |
| $c_8$ | $c_9$ | $c_{10}$ | $c_{11}$ | $c_{12}$ | $c_{13}$ | $c_{14}$ | $c_{15}$ |
| $c_{16}$ | $c_{17}$ | $c_{18}$ | $c_{19}$ | $c_{20}$ | $c_{21}$ | $c_{22}$ | $c_{23}$ |
| $c_{24}$ | $c_{25}$ | $c_{26}$ | $c_{27}$ | $c_{28}$ | $c_{29}$ | $c_{30}$ | $c_{31}$ |
| NBI for Serving Cell i | | | | | R | E |
| Corresponding RSRP for new beam index (optional) | | | | | | R |
| NBI for Serving Cell j | | | | | R | E |
| Corresponding RSRP for new beam index (optional) | | | | | | R |
| ... |
| NBI for Serving Cell k | | | | | R | E |
| Corresponding RSRP for new beam index (optional) | | | | | | R |

| $c_0$ | $c_1$ | $c_2$ | $c_3$ | $c_4$ | $c_5$ | $c_6$ | $c_7$ |
| --- | --- | --- | --- | --- | --- | --- | --- |
| $c_8$ | $c_9$ | $c_{10}$ | $c_{11}$ | $c_{12}$ | $c_{13}$ | $c_{14}$ | $c_{15}$ |
| $c_{16}$ | $c_{17}$ | $c_{18}$ | $c_{19}$ | $c_{20}$ | $c_{21}$ | $c_{22}$ | $c_{23}$ |
| $c_{24}$ | $c_{25}$ | $c_{26}$ | $c_{27}$ | $c_{28}$ | $c_{29}$ | $c_{30}$ | $c_{31}$ |
| NBI for Serving Cell i | | | | | | R | R |
| NBI for Serving Cell j | | | | | | R | R |
| ... |
| NBI for Serving Cell k | | | | | | R | R |

ELECTRONIC DEVICE AND METHOD FOR BEAM FAILURE RECOVERY

INCORPORATION BY REFERENCE

This present application claims the benefit of priority to U.S. Provisional Application No. 62/824,458, "Method and Apparatus for SCell Beam Failure Recovery" filed on Mar. 27, 2019, U.S. Provisional Application No. 62/841,908, "Method and Apparatus for Beam Failure Recovery" filed on May 2, 2019, and U.S. Provisional Application No. 62/863,948, "Method and Apparatus for 2 Step RACH Beam Failure Recovery" filed on Jun. 20, 2019, which are incorporated by reference herein in their entireties.

TECHNICAL FIELD

The present application relates generally to wireless communication technology including beam-formed transmission and reception.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) are used in 5th Generation (5G) wireless communication systems to increase system capacity. Beamforming schemes can be employed to focus transmitted and/or received signal in a desired direction to compensate for path loss of high frequency signals. For example, a base station may employ multiple beams to cover a serving area in a 5G system.

SUMMARY

Aspects of the disclosure provide an electronic device including processing circuitry and a method for beam failure recovery (BFR). The processing circuitry can determine whether beam failure occurs on at least one of a plurality of cells configured for serving an electronic device. When the beam failure is determined to occur on the at least one of the plurality of cells, the processing circuitry can send an uplink (UL) message that includes a first portion and a second portion to a network. The first portion can indicate the beam failure and can be transmitted using a physical random access channel (PRACH) resource. The second portion can indicate at least one of cell information of the at least one of the plurality of cells and new beam information of one or more new candidate beams for the at least one of the plurality of cells. The second portion can be transmitted using a physical uplink shared channel (PUSCH) resource. In an embodiment, the second portion includes a BFR request (BFRQ) medium access control (MAC) control element (CE). The processing circuitry can send the first portion using a PRACH preamble on a PRACH and send the BFRQ MAC CE on a PUSCH.

In an embodiment, the cell information includes at least one cell index corresponding to the at least one of the plurality of cells. The new beam information includes at least one new beam index of the one or more new candidate beams. The at least one of the plurality of cells includes an SCell and/or a PCell.

In an embodiment, the processing circuitry can receive a downlink (DL) message from the network. The DL can indicate a BFR response.

In an embodiment, the processing circuitry can randomly select the PRACH resource from a set of unreserved PRACH resources for the electronic device. The PUSCH resource is associated with the PRACH resource and unreserved. In an example, the UL message includes one or more data portions to be sent using the PUSCH resource. The processing circuitry can determine a transmission order for the BFRQ MAC CE and the one or more data portions based on a priority rule for the UL message. The processing circuitry can send the BFRQ MAC CE using the PUSCH resource based on the transmission order. In an example, the second portion includes another BFRQ MAC CE and the processing circuitry can send the other BFRQ MAC CE on the PUSCH. In an example, the cell information includes at least one cell index corresponding to the at least one of the plurality of cells. The new beam information includes at least one new beam index for the at least one of the plurality of cells. The BFRQ MAC CE further includes a device identification (ID) for the electronic device.

In an embodiment, the processing circuitry can receive, from the network, a signal indicating the PRACH resource that is reserved for the electronic device. The PUSCH resource is associated with the PRACH resource and is reserved.

In an embodiment, the at least one of the plurality of cells includes multiple SCells that share the PRACH resource and the PUSCH resource.

BRIEF DESCRIPTION OF THE DRAWINGS

Various embodiments of this disclosure that are proposed as examples will be described in detail with reference to the following figures, wherein like numerals reference like elements, and wherein:

FIGS. 6A-6E show examples of BFRQ MAC CE formats according to embodiments of the disclosure.

DETAILED DESCRIPTION OF EMBODIMENTS

Figure 1:
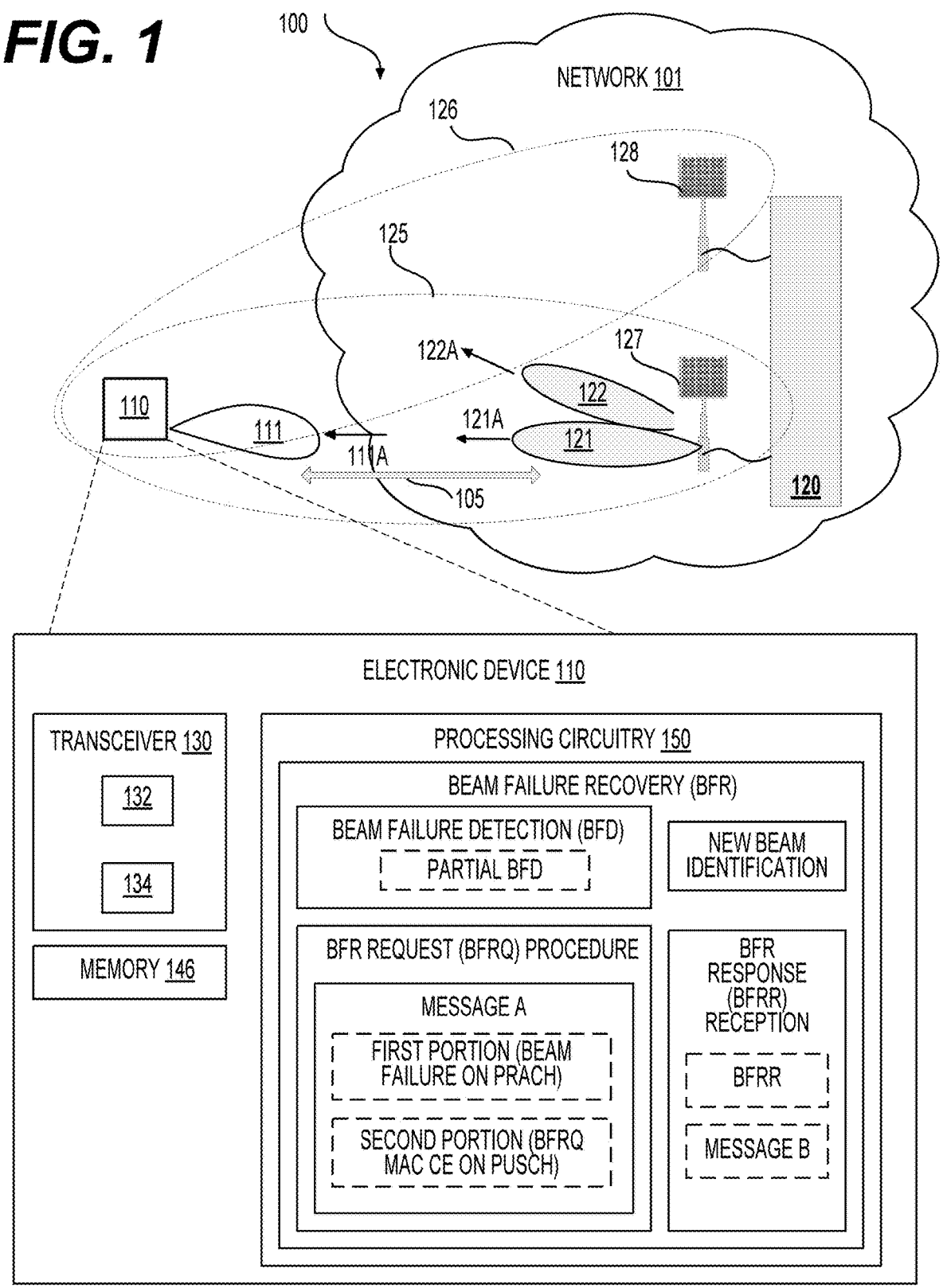
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. One or more cells can be configured to serve the electronic device 110, for example, by a base station 120 in the network 101. The one or more cells can include a first cell 125 having a first carrier and a second cell 126 having a second carrier. The first carrier and the second carrier can be aggregated and transmitted in parallel to/from the electronic device 110 in carrier aggregation (CA), and thus increasing a bandwidth and a data rate. In an example, the base station 120 can control a first transmission reception point (TRP) 127 to cover the first cell 125 and a second TRP 128 to cover the second cell 126. In an example, the network 101 includes a fifth generation (5G) radio access network (RAN) (or Next Generation (NG) RAN) and a 5G core network (5GC) that uses 5G mobile network technology. The base station 120 is a next generation Node B (gNB) specified in 5G new radio (NR) air interface standards developed by 3rd Generation Partnership Project (3GPP).

In an embodiment, in the first cell 125, the electronic device 110 communicates wirelessly with the base station 120 via a wireless link 105 (also referred to as a link 105) associated with a beam 121 transmitted from the base station 120 and a beam 111 received by the electronic device 110. In general, a beam is allocated with radio resources including a set of time and/or frequency resources. In some embodiments, a beam is further associated with a direction indicating a dominant propagation direction of signal energy of the beam. For example, in the first cell 125, beams 121-122 transmitted from the first TRP 127 of the base station 120 mainly propagate along directions 121A-122A, respectively, thus, are referred to as transmission beams (Tx beams) 121-122 of the base station 120. The beam 111 can be referred to as the reception beam (Rx beam) 111 that mainly propagates along a direction 111A. In some embodiments, a beam can refer to a signal or a channel transmitted from or received by the electronic device 110 or the base station 120.

In general, beam management, e.g., a set of procedures to acquire and maintain a set of Tx and Rx beams, is implemented to form and maintain a suitable link between the base station 120 and the electronic device 110 for uplink (UL) and downlink (DL) transmission/reception. In some embodiments, beam management can include initial beam establishment, beam adjustment (also referred to as beam tracking), and beam failure recovery. The initial establishment can initially establish the link (or a beam pair such as the link 105 including the beams 121 and 111) between the base station 120 and the electronic device 110. After the link is established, beam adjustment including a regular reevaluation and potential adjustment of the beam pair can be used to compensate for movements and rotations of the electronic device 110, gradual changes in an environment, and the like. A feedback rate for a beamformed channel state can refer to a frequency of the regular reevaluation of the beam pair. While a higher feedback rate can provide more up-to-date information of the beam pair, the higher feedback rate can also result in a larger signaling overhead. In some cases, movements in the environment or other events may result in sudden blockage of the beam pair, and thus a sudden connection loss that occurs faster than the feedback rate and without sufficient time for the beam adjustment to adapt, resulting in beam failure on the first cell 125. The beam failure (also referred to as a beam failure event) on the first cell 125 can occur, for example, when the link is broken and there is no sufficient time for the regular beam adjustment to adapt the broken link. Similarly, beam failure of other cells that serve the electronic device 110 can occur. Accordingly, a set of procedures (also referred to a BFR procedure) can be implemented to handle the beam failure.

In an embodiment, the BFR procedure can include a plurality of steps: beam failure detection (BFD), new beam identification, a BFR request (BFRQ) step, BRF response (BFRR) reception, and/or the like. When beam failure of at least one of the one or more cells configured to serve the electronic device 110 is determined, in the BFRQ step, a BFRQ that indicates the beam failure on the at least one of the one or more cells, cell information of the at least one of the one or more cells, new beam information for the at least one of the one or more cells, beam measurement(s) for the at least one of the one or more cells, and/or the like can be sent to the network 101.

According to aspects of the disclosure, a first procedure (also referred to as a 2-step random access procedure) including a step A and a step B can be used to implement the BFRQ step and the BFRR reception, respectively, for example, when the beam failure is detected on the at least one of the one or more cells.

In the step A of the first procedure, the electronic device 110 can send an UL message (e.g., a message A or MsgA) including the BFRQ to the network 101. The BFRQ can include a first portion and a second portion. A portion (e.g., the first portion) of the BFRQ can be transmitted using a random access preamble. The first portion can indicate the beam failure. The second portion can indicate the cell information, the new beam information, and/or the like. In an embodiment, the first portion is transmitted on a physical random access channel (PRACH) using a PRACH resource, and the second portion is transmitted on a physical uplink shared channel (PUSCH) using a PUSCH resource. The PUSCH resource used to transmit the second portion can be associated with the PRACH resource used to transmit the first portion. In an embodiment, the first portion is a PRACH preamble and the second portion is a BFRQ medium access control (MAC) control element (CE) sent on the PUSCH.

In an embodiment, the first procedure is contention-based (CB), and is referred to as a CB first procedure (or a CB 2-step random access procedure for BFR). In the step A of the CB first procedure, the first portion (e.g., the PRACH preamble) and the second portion (e.g., the BFRQ MAC CE) are contention based, for example, no PRACH resource and no PUSCH resource are reserved for the electronic device 110 to send the first portion and the second portion, respectively. The PRACH resource used to send the first portion can be randomly selected, for example, from a set of unreserved PRACH resources by the electronic device 110. The PUSCH resource that is associated with the PRACH resource can be used to send the second portion. An association between PRACH resources and corresponding PUSCH resources can be pre-configured for the electronic device 110, for example, by Radio Resource Control (RRC). In an example, the association between the PRACH resource used to send the first portion and the PUSCH resource used to send the second portion is preconfigured for the electronic device 110. The association can be stored in the memory 146. When the at least one of the one or more cells includes multiple cells, the PRACH resource randomly selected by the electronic device 110 and the corresponding PUSCH resource can be shared by the multiple cells. In an example, when a size of the BFRQ MAC CE is not large enough to include the cell information, the new beam information, and/or the like for the multiple cells, the second portion includes additional BFRQ MAC CE(s) in addition to the BFRQ MAC CE.

The multiple cells can include SCell(s), a PCell, a PSCell, and/or the like. In an example, the multiple cells include SCells and a PCell. In an example, the multiple cells include SCells.

In an embodiment, the first procedure is contention-free (CF), and is referred to as a CF first procedure (or a CF 2-step random access procedure for BFR). In the step A of the CF first procedure, the first portion (e.g., the PRACH preamble) and the second portion (e.g., the BFRQ MAC CE) are contention free, for example, the PRACH resource and the corresponding PUSCH resource that is associated with the PRACH resource are reserved for the electronic device 110 to send the first portion and the second portion, respectively. For example, the network 101 can explicitly indicate the PRACH resource to the electronic device 110, and thus the PRACH resource is reserved for the electronic device 110. When the at least one of the one or more cells includes multiple cells, the reserved PRACH resource and the corresponding PUSCH resource can be shared by the multiple cells. Similarly, the multiple cells can include SCell(s), a PCell, a PSCell, and/or the like. In an example, the multiple cells include SCells and a PCell. In an example, the multiple cells include SCells.

In the step B of the first procedure (e.g., the CB first procedure, the CF first procedure), the BFRR reception is implemented. A DL message (e.g., a message B or MsgB) including a BFRR can be sent by the network 101 and received by the electronic device 110.

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like.

In various examples, the base station 120 can be referred to as a Node B, an evolved Node B, a gNB, and the like. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 can perform beamformed transmission and/or reception to compensate for the propagation loss. In beamformed transmission, signal energy can be focused predominantly toward a specific direction, such as directions 121A-122A associated with the Tx beams 121-122, as described above. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception, such as a direction 111A associated with the Rx beam 111 of the electronic device 110.

Referring to FIG. 1, the base station 120 can control the first TRP 127 to form directional Tx beams including the Tx beams 121-122 to cover the first cell 125. The Tx beams can be generated simultaneously or in different time intervals. Further, the base station 120 can control the second TRP 128 to cover the second cell 126. In an example, a plurality of electronic devices is served by the base station 120. In an example, the electronic device 110 is within the first cell 125 and the second cell 126 and can be served by the first cell 125 and the second cell 126. The first cell 125 and the second cell 126 can overlap. In an example, the first cell 125 and the second cell overlaps partially as shown in FIG. 1. In an example, the first cell 125 is within the second cell 126.

The first cell 125 and the second cell 126 can be formed using the same base station 120 using different TRPs (e.g., the first TRP 127 and the second TRP 128), as shown in FIG. 1. The first cell 125 and the second cell 126 can be formed using a same TRP. The first cell 125 and the second cell 126 can be formed using different base stations.

The electronic device 110 can be any suitable electronic device that can implement beam failure recovery. The electronic device 110 can be configured to implement the first procedure (e.g., the CB first procedure, the CF first procedure), for example, when beam failure is declared. The electronic device 110 can be configured to receive signals from and transmit signals to a plurality of cells, such as the first and second cells 125-126. The electronic device 110 can form multiple links with the network 101 via carrier aggregation. In an example, the electronic device 110 is a terminal device (e.g., user equipment) for wireless communication, such as a cell phone, a smart phone, a tablet computer, a laptop, a smart device, a wearable device, and the like. Similarly, the electronic device 110 can employ one or more antenna arrays to generate directional Tx or Rx beams for transmitting or receiving signals FR1, FR2, and/or the like. The electronic device 110 and/or the base station 120 can also include suitable transceivers and antennas that transmit and receive omnidirectional wireless signals, for example, in FR1.

In some embodiments, the electronic device 110 can be connected to multiple base stations via multiple links using dual connectivity (DC), such as in Evolved Universal Terrestrial Radio Access (E-UTRA) and NR DC. For example, the electronic device 110 is connected to the base station 120 via the link 105 and a second base station (not shown) via a second link (not shown). In an example, the electronic device 110 is connected to the second base station using directional Tx/Rx beams, omnidirectional beams, and the like. In an example, the electronic device 110 is connected to the base station 120 using NR radio access, and to the second base station using E-UTRA.

Referring to FIG. 1, the electronic device 110 can include a transceiver 130, processing circuitry 150, and memory 146 that are coupled together, for example, using a bus architecture (not shown). The transceiver 130 is configured to receive and transmit wireless signals. In an example, the transceiver 130 includes a first transceiver 132 that transmits and receives low frequency signals (LF signals), such as omnidirectional wireless signals, and a second transceiver 134 that transmits and receives the HF signals (e.g., FR2) including Tx and Rx beams. In an example, the link 105 is formed based on the Tx beam 121 and the Rx beam 111 for the electronic device 110 to receive DL signals from the base station 120. In the FIG. 1 example, a direction 111A of the Rx beam 111 is matched to the direction 121A of the Tx beam 121 by tuning respective antennas of the electronic device 110 and/or the base station 120.

In an example, the link 105 can be formed based on the Tx beam 121 and an omnidirectional reception beam (not shown) of the electronic device 110. In an example, the link 105 can be formed based on the Rx beam 111 and an omnidirectional transmission beam (not shown) of the base station 120.

The link 105 can also be used for the electronic device 110 to transmit UL signals to the base station 120 via a Tx beam of the electronic device 110 and a Rx beam of the base station 120. Further, radio resources for the UL signals, such as the Tx beam of the electronic device 110 can be different from the radio resources used for the DL signals. In an example, the electronic device 110 is configured with beam correspondence, and directions of the UL signals (the Tx beam of the electronic device 110 and the Rx beam of the base station 120) in the link 105 are opposite to the directions 111A and 121A, respectively.

In an example, the second transceiver 134 transmits or receives the HF signals (e.g., FR2), and the first transceiver 132 causes an antenna to transmit or receive the LF signals (e.g., FR1). The LF signals can include omnidirectional beams, directional beams, and/or the like. A directional beam in FR1 can be wider (e.g., having a larger angular spread) than a directional beam in FR2. For example, 4 directional beams in FR1 can cover an angular range while 64 directional beams in FR2 can cover the same angular range.

In some embodiments, the transceiver 130 is configured to receive signals (e.g., Tx beams and/or omnidirectional beams) from the network 101. The signals can include reference signals (RSs) that can be used to estimate beam and link qualities and facilitate BFR in cell(s) that serve the electronic device 110. RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH). In an example, RS(s) in the first cell 125 are used to detect beam failure in the first cell 125. In an example, RS(s) in the second cell 126 are used to detect beam failure in the first cell 125. In some examples, RS(s) from another base station can be used to detect beam failure in the first cell 125.

The transceiver 130 can receive a BFRR and/or a new beam report (e.g., indicating a new beam assigned by the network 101 for the electronic device 110) from the network 101 (e.g., the base station 120) on the first cell 125, the second cell 126, and/or the like. The transceiver 130 can receive a BFRR and/or a new beam report from the network 101 (e.g., the base station 120) on a PCell, a PSCell, an SCell, and/or the like.

The transceiver 130 is configured to transmit various signals, such as the HF signals and the LF signals. The transceiver 130 can transmit a BFRQ to the base station 120, for example, using UL physical channels, such as a Physical Random Access Channel (PRACH) (e.g., contention-free (CF) PRACH), a NR-PRACH, and the like, indicating beam failure on a cell, such as the first cell 125. The BFRQ transmitted on the CF PRACH can also indicate cell information, new beam information, and/or the like.

According to aspects of the disclosure, the transceiver 130 can be configured to send the MsgA to the network 101 where the MsgA includes a BFRQ. The transceiver 130 can transmit the first portion (e.g., indicating the beam failure) of the BFRQ using the PRACH resource (e.g., the PRACH preamble). The transceiver 130 can transmit the second portion (e.g., the BFRQ MAC CE) of the BFRQ that indicates the cell information, the new beam information, and/or the like, using the PUSCH resource on the PUSCH. In an example, the PUSCH resource is associated with the PRACH resource.

The processing circuitry 150 can implement the BFR including BFD, new beam identification, a BFRQ step, BFRR reception, and/or the like.

In an embodiment, the electronic device 110 is configured with one or more serving control channels (or serving control channel links) in the first cell 125. When at least one of the one or more serving control channels fails, beam failure can be declared for the first cell 125. In an example, when the one or more serving control channels fail, beam failure is declared for the first cell 125. In an example, when a quality of a serving control channel is less than a threshold, the serving control channel is determined to have failed. For example, when a block error rate (BLER) of a PDCCH is larger than a threshold (e.g., a default BLER set by Radio Link Monitoring (RLM), the PDCCH is determined to have failed.

In an example, when a subset of the one or more serving control channels fails, beam failure is declared for the first cell 125. The beam failure can be referred to as partial beam failure when a number of the subset of the one or more serving control channels is less than a number of the one or more serving control channels. For example, the electronic device 110 is configured with two serving control channels (e.g., a first PDCCH and a second PDCCH) in the first cell 125. When the first PDCCH and the second PDCCH fail, beam failure (also referred to as full beam failure) can be declared for the first cell 125. When the first PDCCH fails, partial beam failure can be declared for the first cell 125. Partial beam failure can be declared when the first cell 125 is a PCell or a PSCell.

The beam failure can be referred to as full beam failure when each of the one or more serving control channels is determined to have failed. When multiple serving control channels are configured for the electronic device 110, detecting the partial beam failure can be faster than detecting the full beam failure, and thus can shorten a duration used for beam failure detection.

The processing circuitry 150 can measure one or more signals, such as RS(s), to obtain signal qualities including reference signal received power (RSRP), reference signal received quality (RSRQ), a BLER, and the like. Beam failure detection can be based on one or more of the signal qualities. The electronic device 110 can use an SSB, a CSI-RS, and/or the like for beam failure detection, for example, based on a pre-defined rule. In an example, the electronic device 110 is served by the first cell 125. When a signal quality or signal qualities of RS(s) in the first cell 125 are worse than respective threshold(s), beam failure can be declared. As described above, partial beam failure can be declared, for example, when a signal quality of a RS corresponding to a serving control channel is worse than a threshold. Alternatively, full beam failure can be declared, for example, when a signal quality corresponding to each serving control channel is worse than a threshold. Alternatively, a beam failure instance (BFI) of the first cell 125 can be declared. In an example, beam failure in the first cell 125 is detected or declared when a number of consecutive BFIs of the first cell 125 is equal to or larger than a threshold, such as a maximum number configured by RRC. Alternatively or additionally, signal(s) from the second cell 126 can be used for BFD in the first cell 125.

The processing circuitry 150 can be configured to identify a new candidate beam used in forming a new link in a failed cell, such as the first cell 125. The new link can be used in communication with the network 101. In an embodiment, the processing circuitry 150 can measure or monitor RS(s) (e.g., an SSB, a periodic CSI-RS) used for beam identification to determine the new candidate beam. The RS(s) can correspond to candidate beam(s). The processing circuitry 150 can measure signal qualities, such as RSRP, of the RS(s). Further, the processing circuitry 150 can determine the new candidate beam based on the signal qualities of the candidate beam(s).

The processing circuitry 150 can be configured to perform a second procedure that implements the BFRQ step (e.g., a step A of the second procedure) and the BFRR reception (e.g., a step B of the second procedure). The second procedure can be part of a CF RACH BFR procedure. In the step A of the second procedure, the processing circuitry 150 can transmit a BFRQ to the network 101 (e.g., the base station 120) using a CF RACH (or PRACH) where a dedicated RACH resource is associated with each candidate beam RS resource. For example, a first dedicated RACH resource is associated with a first candidate beam RS resource, a second dedicated RACH resource is associated with a second candidate beam RS resource, an Nth dedicated RACH resource is associated with an Nth candidate beam RS resource, and the like where N is a positive integer. The new candidate beam corresponding to one of the candidate beam RS resources, such as the second candidate beam RS resource, is identified. Accordingly, when the beam failure is detected and the new candidate beam is identified, the processing circuitry 150 can transmit the second dedicated RACH resource associated with the second candidate beam RS resource. When the base station 120 receives the second dedicated RACH resource, the base station 120 can determine that the new candidate beam is the second candidate beam.

In an embodiment, the electronic device 110 is configured with a PCell and multiple SCells. The second procedure can be applied to the PCell and/or the multiple SCells. When the second procedure is applied for the multiple SCells, a relatively large amount of dedicated (or CF) RACH resources on the PCell is used and a UL overhead for the PCell can be relatively large. For example, the electronic device 110 is configured with 32 SCells and 64 candidate beams RS resources corresponding to different beam directions are configured for each SCell. Thus, 2048 dedicated RACH resources on the PCell are to be reserved for the 32 SCells.

In the step B of the second procedure, a BFRR can be received by the electronic device 110. In an example, the BFRR is detected within a pre-defined duration, and thus the beam failure recovery is successful based on the reception of the BFRR.

The processing circuitry 150 can be configured to perform the first procedure to implement the BFRQ step and the BFRR reception, as described above. In the step A of the first procedure, the processing circuitry 150 can send the UL message (e.g., the MsgA) to the network 101. The MsgA can include the BFRQ that indicates the beam failure, the cell information, and the corresponding new beam information of the new candidate beam(s). In an example, the beam failure is indicated in the first portion using a random access process, such as via a PRACH resource (e.g., a preamble) on a PRACH. The cell information and the corresponding new beam information of the new candidate beam(s) are indicated in the second portion (e.g., a payload) on an UL channel. The payload and the UL channel can be a PUSCH resource (e.g., a BFRQ MAC CE) on a PUSCH. The cell information can include an index or indices of the at least one of the one or more cells. In an example, the new beam information includes an index of a candidate beam resource corresponding to the new candidate beam. In an example, the new beam information includes indices of candidate beam resources corresponding to the new candidate beams. Additional information, such as beam measurement(s) (e.g., RSRP(s)), a device identification (ID) of the electronic device 110, can be indicated in the second portion (e.g., the BFRQ MAC CE).

As described above, in the CB first procedure, the PRACH resource used to transmit the first portion is randomly selected by the electronic device 110 from a set of unreserved PRACH resources, and thus is unreserved. Accordingly, the corresponding PUSCH resource used to transmit the second portion is unreserved. When the same PRACH resource and/or the PUSCH resource are used by another electronic device at a same time, collision can occur.

As described above, in the CF first procedure, the PRACH resource used to transmit the first portion is reserved for the electronic device 110. Accordingly, the corresponding PUSCH resource used to transmit the second portion is also reserved. When another electronic device transmits using a second PRACH resource and/or a second PUSCH resource at a same time, no collision occurs because the PRACH resource is different from the second PRACH resource and the PUSCH resource is different from the second PUSCH.

In the step B of the first procedure, the processing circuitry 150 can be configured to monitor a network response or a BFRR to the BFRQ. In an example, the processing circuitry 150 can receive a DL message (e.g., MsgB) from the network 101 where the MsgB includes the BFRR. In an embodiment, after transmitting the BFRQ, the processing circuitry 150 monitors DL for the BFRR. The BFRR can be monitored, for example, within a pre-defined duration. In an example, the processing circuitry 150 receives the BFRR (e.g., included in the MsgB) within the pre-defined duration, and thus the BFR is completed. The processing circuitry 150 can determine whether the beam failure recovery is successful based on reception of the BFRR within the pre-defined duration.

The network response or the BFRR can be transmitted in the failed cell(s) or another cell. In an example, the network response is transmitted in a non-failing cell serving the electronic device 110. When the failed cell, such as the first cell 125, is an SCell, the BFRR can be transmitted in a PCell or a PSCell that serves the electronic device 110.

In an example, the electronic device 110 is in DC with the base station 120 and another base station. The new beam information can be communicated to the base station 120 via the other base station. Thus, the embodiments (e.g., the first procedure, the second procedure) described above can be suitably adapted.

The processing circuitry 150 can be implemented using various techniques, such as integrated circuits, one or more processors executing software instructions, and the like.

The memory 146 can be any suitable device for storing data and instructions to control operations of the electronic device 110. In an example, the memory 146 stores information (e.g., thresholds) and instructions associated with beam failure recovery, and software instructions to be executed by a processor, such as the processing circuitry 150. The memory 146 can store various results including signal qualities.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 2:
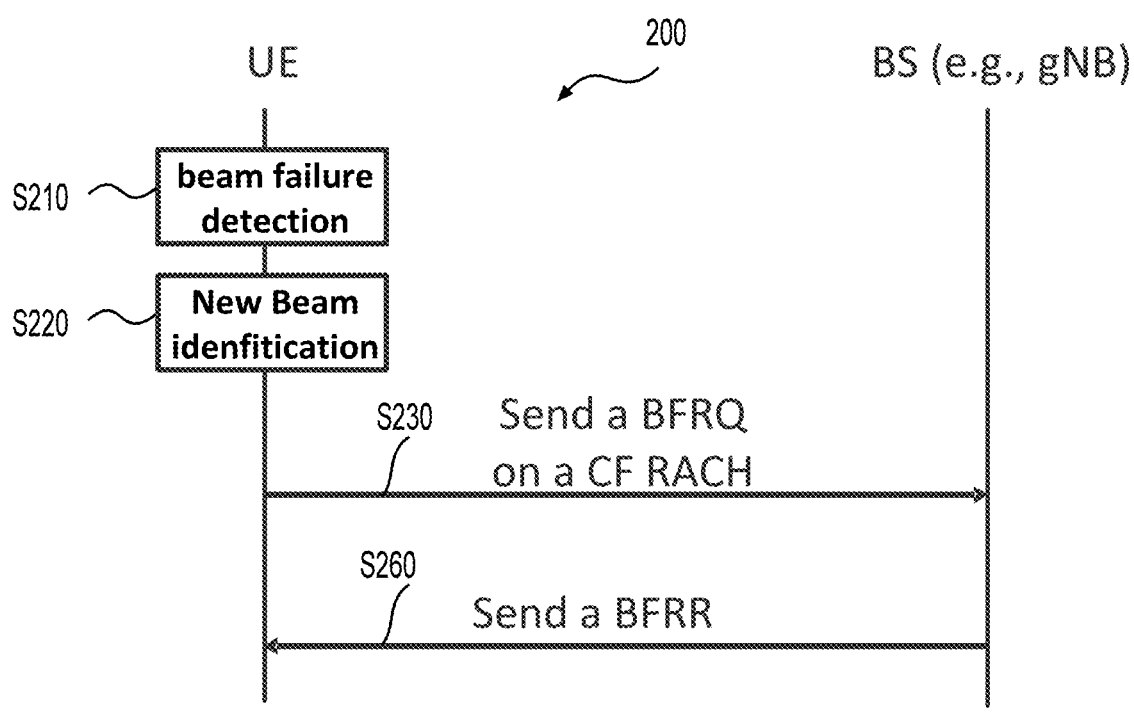
FIG. 2 shows a flow chart of an exemplary process 200 according to an embodiment of the disclosure.

FIG. 2 shows a flowchart of an exemplary process 200 according to an embodiment of the disclosure. The process 200 can be used to implement BFR for a cell, such as a PCell, a PSCell, or the like.

At S210, beam failure on the cell can be detected by a UE, such as the electronic device 110. One or more serving control channels can be configured for the cell. In an example, when each of the one or more serving control channels fails (e.g., when a BLER of each of the one or more serving control channels exceeds a default BLER), the beam failure is declared.

At S220, a new candidate beam can be identified for BFR in the failed cell, for example, by monitoring RS(s) for beam identification, as described above.

At S230, a BFRQ can be sent on a CF RACH to a base station (BS) (e.g., a gNB), as described above. In an example, a dedicated PRACH resource is reserved for the UE, and the BFRQ is sent using the dedicated PRACH resource on the CF RACH. In an embodiment, the BFRQ can indicate the beam failure of the failed cell and the new candidate beam identified in S220. The cell information of the failed cell is indicated in the BFRQ. S230 is an example of the step A of the second procedure described above.

At S260, a BFRR can be sent from the BS to the UE and received by the UE. In an example, the BFRR is detected within a pre-defined duration, and thus the beam failure recovery is successful based on the reception of the BFRR. S230 is an example of the step B of the second procedure described above. Subsequently, beam switching can be performed to form a new link in the cell.

The process 200 is an example of the CF RACH BFR procedure, and S230 and S260 are an example of the second procedure.

A random access procedure (also referred to as a random access process or random access) can be used in BFR, initial access, reestablishment a radio link, or the like. A random access procedure can include any suitable number of steps.

Figure 3:
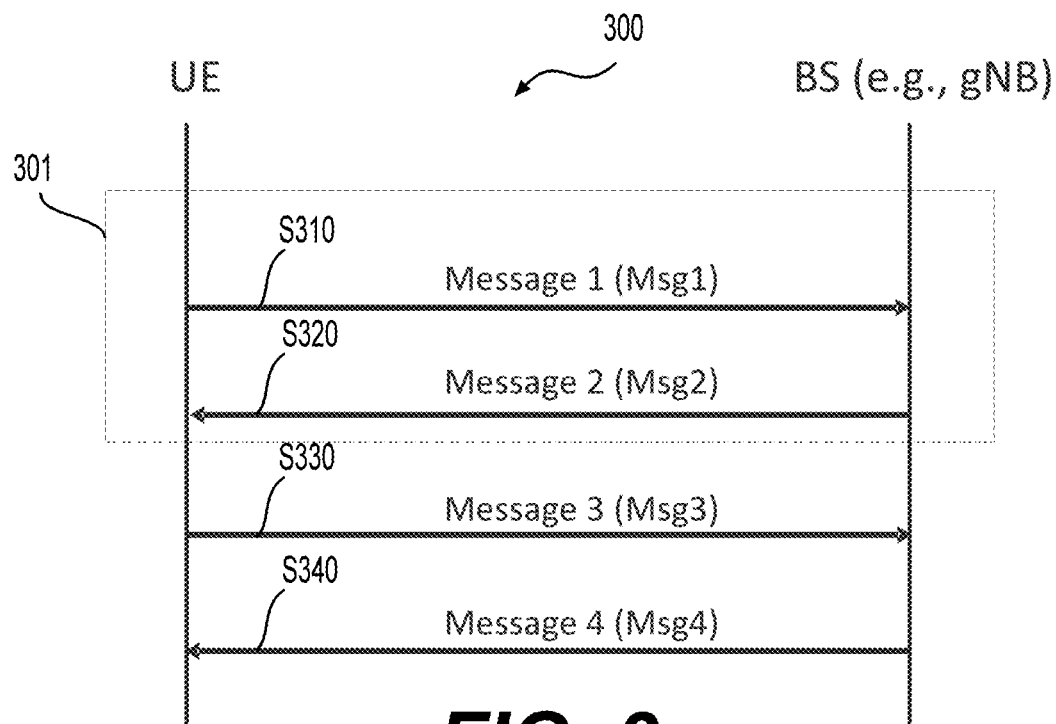
FIG. 3 shows an example of a 4-step random access procedure 300 according to an embodiment of the disclosure.

In an embodiment, a random access procedure includes four steps, and thus is referred to as a 4-step random access procedure. FIG. 3 shows an example of a 4-step random access procedure 300 according to an embodiment of the disclosure. The 4-step random access procedure 300 can be implemented in any suitable cell, such as a PCell, a PSCell, a SCell, or the like.

At a first step S310, a message 1 (Msg1) can be sent from a UE (e.g., the electronic device 110) to a BS (e.g., a gNB). The Msg1 can be a random access preamble (or preamble sequence) transmitted on a PRACH, and thus can be a PRACH preamble. In an example, the PRACH is configured for a PCell. The PCell can be configured with a plurality (e.g., 64) of preamble sequences. In an embodiment, the plurality of preamble sequences can include a first subset of preamble sequences used for CB random access and a second subset of preamble sequences used for CF random access.

In the CB random access, the UE can randomly select a preamble sequence in the first subset. In various examples, the first step S310 can be implemented by a second UE. When the UE and the second UE implement the first step S310 at a same time using the same preamble sequence, collision (or contention) can occur. When the UE and the second UE implement the first step S310 at a same time using different preamble sequence, collision may not occur.

In the CF random access, the BS can explicitly indicate a preamble sequence in the second subset to the UE and a different preamble sequence in the second subset to the second UE, and thus, no collision occurs.

At a second step S320, a message 2 (Msg2) can be sent from the BS to the UE. The Msg2 can be a random access response (RAR). The RAR can indicate UL resources (e.g., PUSCH resource) granted to the UE. In an example, the RAR includes a detected preamble ID, a temporary cell radio network temporary ID (TC-RNTI), and an UL grant for scheduling a PUSCH transmission from the UE known as a message 3 (Msg3).

At a third step S330, in response to the RAR, the Msg3 can be sent from the UE to the BS for contention resolution using the UL resources granted at S320. For example, the UL resources can be a MAC CE on a PUSCH, and thus Msg3 can be transmitted on a PUSCH. In an example, the Msg3 indicates a device identification (ID) of the UE within the cell, such as a cell radio network temporary ID (C-RNTI) assigned to the UE, a UE-ID, or the like. The Msg3 can include various messages, such as an initial layer 3 (L3) message for a RRC connection request, and/or the like.

At a fourth step S340, a message 4 (Msg4) can be sent from the BS to the UE, for example, upon receiving the Msg3. The Msg4 can be used for contention resolution, and thus can be referred to as a contention resolution message. The Msg4 can include a L3 Message response such as RRC connection setup. The Msg4 can include a contention resolution ID MAC CE.

As described above, the third step S330 and the fourth step S340 can be used to resolve contention in the CB random access, the 4-step random access procedure 300 can be referred to as a CB 4-step random access procedure. For the CF random access, the third step S330 and the fourth step S340 can be omitted, and thus a process 301 that includes S310 and S320 is referred to as a CF random access procedure.

The CB 4-step random access procedure 300 can be used in BFR and referred to as a third procedure (or a CB 4-step random access BFR procedure). For example, the Msg1 can indicate the beam failure using a randomly selected PRACH resource, and the Msg3 can indicate the cell information, the new beam information, and/or the like. The Msg4 can include the BFRR. The third procedure 300 can be a fallback solution when no designated PRACH resource(s) are available. In some examples, the latency due to collision and implementing 2 more steps (as compared with the first procedure or the second procedure) can be relatively large and may not be suitable for handling BFR that can have a relatively high priority.

Figure 4:
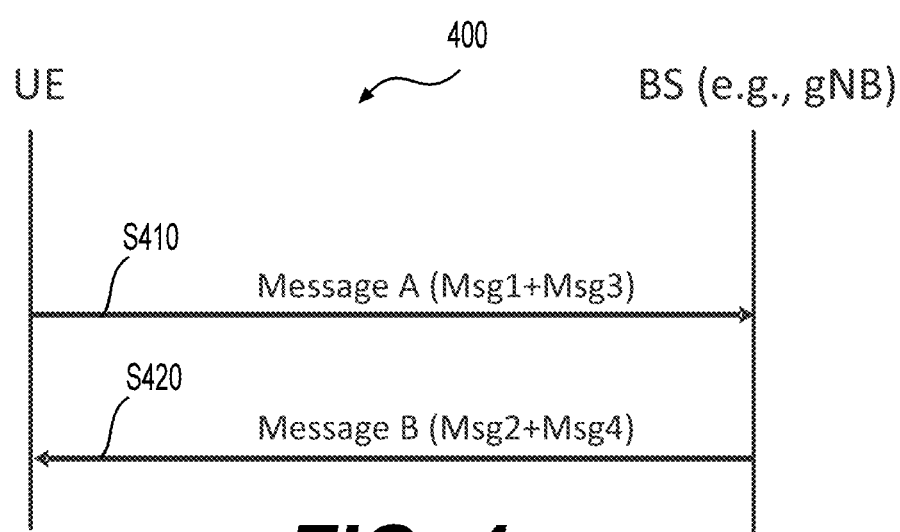
FIG. 4 shows an example of a 2-step random access procedure 400 according to an embodiment of the disclosure.

FIG. 4 shows an example of a 2-step random access procedure 400 according to an embodiment of the disclosure. The 2-step random access procedure 400 can be implemented in any suitable cell, such as a PCell, a PSCell, a SCell, or the like. In an example, the 2-step random access procedure 400 is contention based.

At a first step S410, an UL message (e.g., the MsgA) can be sent from a UE (e.g., the electronic device 110) to a BS (e.g., a gNB). The MsgA can include the Msg1 as described at S310 and the Msg1 as described at S330. Therefore, the MsgA can be a combined message that includes multiple messages (e.g., the Msg1 and the Msg3) that are transmitted in multiple steps of the CB 4-step random access procedure.

At a second step S420, a DL message (e.g., the MsgB) can be sent from the BS to the UE. The MsgB can include the Msg2 sent at S320 and the Msg4 sent at S340, as described above. Therefore, the MsgB can be a combined message that includes multiple messages (e.g., the Msg2 and the Msg4) that are transmitted in multiple steps of the CB 4-step random access procedure. In an example, the MsgB includes the Msg2 (e.g., a RAR).

Referring to FIGS. 3-4, the 2-step random access procedure 400 can reduce latency of the 4-step random access procedure 300 by using a less number of steps. The 2-step random access procedure 400 can be used to reduce listen-before-talk operations for 5G NR in unlicensed spectrum (NR-U). The 2-step random access procedure 400 can be used in small packet data transmission where an overhead for a RRC connection for the small packet can be significant when compared with the small packet data transmission.

The 2-step random access procedure 400 can be adapted for BFR, as described above in the first procedure and as shown below in FIG. 5.

Figure 5:
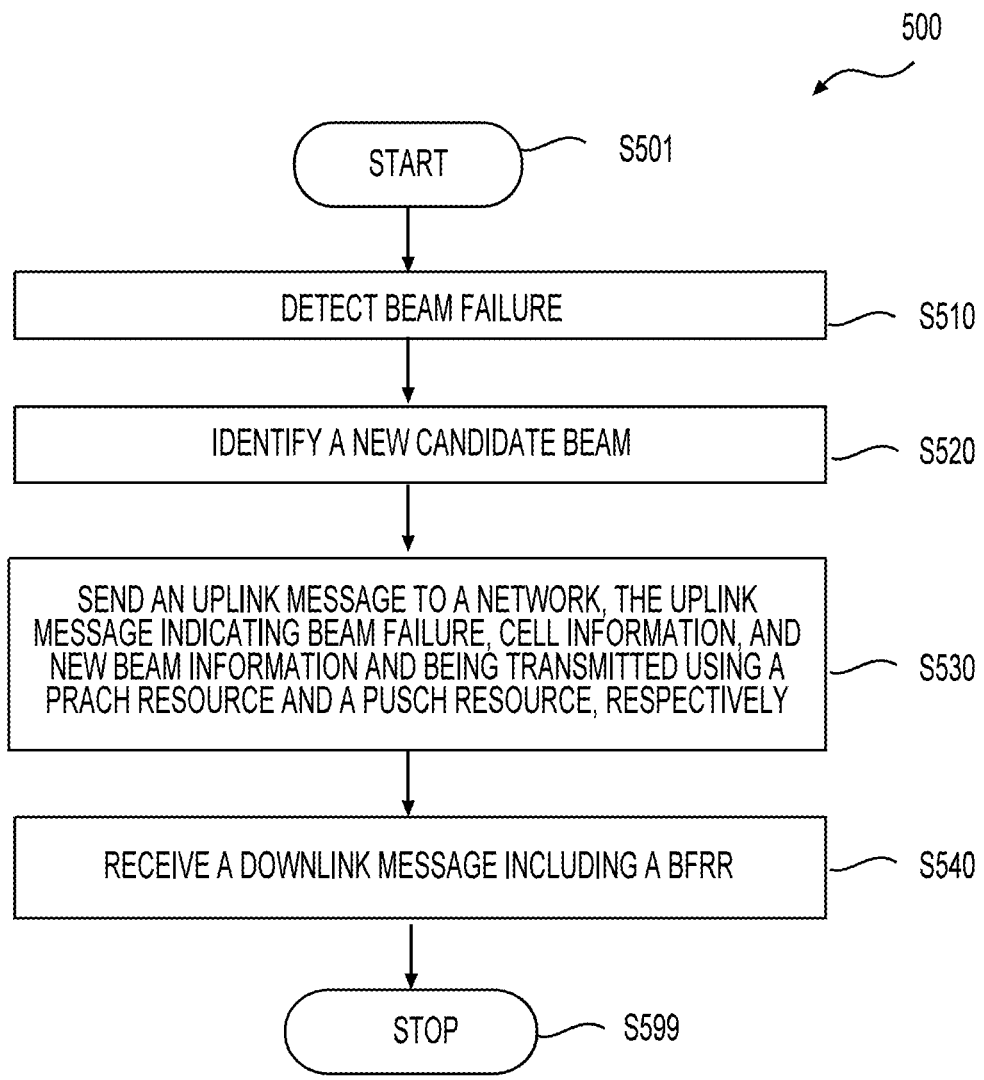
FIG. 5 shows a flow chart of an exemplary process 500 according to an embodiment of the disclosure.

FIG. 5 shows a flow chart of an exemplary process 500 according to an embodiment of the disclosure. The process 500 can be used to implement beam failure recovery for a cell, such as a PCell, a PSCell, or an SCell. In an example, an electronic device, such as the electronic device 110, is configured to perform the process 500. The process 500 starts at S501, and proceeds to S510.

At S510, beam failure on the cell that serves the electronic device can be detected. Signals (e.g., RSs) can be measured to obtain signal qualities including RSRP, RSRQ, BLER, and/or the like. Beam failure can be detected based on the signal qualities, as described above with reference to FIG. 1. The electronic device can be configured with a set of serving control channels in the cell. Beam failure (e.g., full beam failure) can be determined or declared for the cell when the set of serving control channels fails. Alternatively, beam failure (e.g., partial beam failure) can be determined or declared for the cell when a subset of the set of serving control channels fails. In an example, partial beam failure can be declared when the cell is a PCell or a PSCell. S510 can be applied to detect beam failure on additional cell(s) that serve the electronic device.

At S520, a new candidate beam can be identified for beam failure recovery in the cell (or the failed cell), for example, based on RS(s), as described above with reference to FIG. 1.

At S530, an UL message (e.g., the MsgA) can be sent from the electronic device to a network (e.g., the network 101) or a base station (e.g., the base station 120) in the network. S530 can be adapted from S410.

In an example, the step A in the first procedure is implemented in S530. As described above, the MsgA can include the BFRQ that includes the first portion and the second portion. The first portion indicating the beam failure can be transmitted using a PRACH resource on a PRACH. The second portion can indicate cell information (e.g., a cell index) of the cell, new beam information (e.g., a new candidate beam index) of the new candidate beam identified at S520, beam measurement(s) (e.g., RSRP(s)), and/or the like. The second portion can be transmitted using a PUSCH resource on a PUSCH. The PUSCH resource can be associated with the PRACH resource used to transmit the first portion. In an embodiment, the first portion is a PRACH preamble and the second portion includes a BFRQ MAC CE sent on the PUSCH.

In an example, beam failure of a plurality of cells can be determined at S510, the cell information for the plurality of cells can include cell indices of the plurality of cells. A plurality of new candidate beams can be identified at S520, and the new beam information can include new candidate beam indices of the plurality of new candidate beams.

S530 can be an example of the step A of the CF first procedure. The PRACH resource is reserved for the electronic device to send the first portion. The PUSCH resource that is associated with the PRACH resource is reserved for the electronic device to send the second portion.

S530 can be an example of the step A of the CB first procedure. No PRACH resource and no PUSCH resource are reserved for the electronic device to send the first portion and the second portion, respectively. The electronic device can randomly select the PRACH resource to send the first portion. The MsgA can include additional information (e.g., one or more data portions) to be transmitted, such as those included in the Msg3 (e.g., an initial L3 message, other MAC CEs) as described above with references to FIGS. 3-4.

In the CB first procedure, when a size configured for the PUSCH resource is less than a size of the MsgA, a priority rule can be used to determine which portion(s) of the MsgA can be transmitted prior to remaining portion(s) of the MsgA. The priority rule can be pre-defined for the electronic device or signaled to the electronic device from the network. In an example, the priority rule is defined in a standard (e.g., a standard developed by 3GPP) and is to be implemented by the electronic device (e.g., the electronic device 110). The priority rule can be stored in the memory 146. For example, the MsgA includes the BFRQ MAC CE, the initial L3 message, and another MAC CE (a non-BFRQ MAC CE). The priority rule specifies following priorities with a descending order: the initial L3 message, the BFRQ MAC CE, and the other MAC CE. Accordingly, the initial L3 message has a higher priority to be transmitted than that of the BFRQ MAC CE. When the size of the PUSCH is less than a size of the BFRQ MAC CE and the initial L3 message, the BFRQ MAC CE is transmitted at a next opportunity after transmitting the initial L3 message.

In an example, the plurality of cells is determined to have failed. A first BFRQ MAC CE includes cell information and new beam information of a first subset of the plurality of cells, a second BFRQ MAC CE includes cell information and new beam information of a second subset of the plurality of cells, the first BFRQ MAC CE and the second BFRQ MAC CE are transmitted sequentially.

At S540, a DL message (e.g., the MsgB) can be received from the network. The MsgB can include a BFRR as described above. S540 can be an example of the step B of the first procedure. The process 500 proceeds to S599, and terminates. In an embodiment, the step B in the first procedure is implemented in S540.

The process 500 can be applied for a single cell and a plurality of cells. When the plurality of cells configured for the electronic device fails, the PRACH resource and new PUSCH resource can be shared by the plurality of cells. The plurality of cells can include SCell(s), a PCell, a PSCell, and/or the like. In an example, the plurality of cells includes SCells and a PCell. In an example, the plurality of cells includes SCells.

Compared with the third procedure, the CB first procedure (e.g., as described in S530 and S540) can decrease latency, for example, by reducing 4 steps to 2 steps.

The second procedure (e.g., S230 and S260 in FIG. 2) and the CF first procedure can be compared as below. When applied to multiple cells and/or multiple beams, the reserved PRACH resource and the corresponding PUSCH resource in the CF first procedure can be shared by the multiple failed cells and/or the multiple beams. Accordingly, the CF first procedure can use a less amount of resources than that of the second procedure, and thus can have a less UL overhead than that of the second procedure. For example, when 5 SCells that serve the electronic device are determined to have failed, only 1 PRACH resource and 1 corresponding PUSCH are reserved in the CF first procedure (e.g., S530) to indicate the beam failure of the 5 SCells and the new beam information. On the contrary, 5 PRACH resources are reserved in the third procedure (e.g., S230 in FIG. 2) to indicate the beam failure of the 5 SCells and the new beam information.

In an example, only a PCell is determined to have failed, the CF first procedure for BFR described in FIG. 5 (e.g., S530) is identical or similar to the second procedure described in S230 of FIG. 2, and the PRACH resource can be associated with a new PCell beam. New beam for the PCell does not need to be reported. Corresponding RSRP can be reported.

As described above, a BFRQ MAC CE can indicate cell information, new beam information, beam measurement(s), and/or the like. The cell information can include one or more cell indices of failed cell(s). The new beam information can include one or more new candidate beam indices of respective one or more new candidate beams. The BFRQ MAC CE can further indicate beam measurement(s), such as RSRP(s) used in beam reporting. The BFRQ MAC CE can further indicate (e.g., via 1 bit) whether the electronic device 110 can identify a new candidate beam that satisfies a minimum RSRP condition, and thus facilitate a BS (e.g., a gNB) to deactivate an SCell. For example, when an SCell fails and no new candidate beam can be identified for the failed SCell, the gNB can deactivate the failed SCell.

FIGS. 6A-6D show examples of BFRQ MAC CE formats 610-613, respectively, according to embodiments of the disclosure. The BFRQ MAC CE formats 610-613 are illustrated using respective BFRQ MAC CEs 610A-613A. The BFRQ MAC CE formats 610-613 can include various fields, such as '$C_N$', 'R', 'E', 'NBI', 'RSRP', and/or the like that indicate cell information, new beam information, beam measurement(s), and/or the like. N can be an integer and indicate a cell number or a cell index. In an embodiment, $C_N$ indicates whether new beam information is available for an Nth cell in the respective BFRQ MAC CE. The Nth cell can be a PCell, a PSCell, or an SCell. 1 bit can be used for $C_N$. For example, $C_N$ being 1 indicates that the Nth cell fails (or the Nth cell is determined to have failed), and the new beam information is available for the Nth cell. $C_N$ being 0 indicates that the new beam information is not available for the Nth cell. In an example, $C_N$ being 0 indicates that the Nth cell can be deactivated or no beam failure is detected for the Nth cell.

'R' can represent a field that is reserved or a reserved field. In an example, 1 bit is used for 'R' and 'R' is set to 0. 'NBI' can represent the new beam information (e.g., the new candidate beam index) corresponding to a cell (e.g., a cell i, a cell j, or a cell k shown in FIGS. 6a-6D) that fails. 'E' can indicate whether a corresponding beam measurement (e.g., RSRP) is available in the respective BFRQ MAC CE. In an example, 1 bit is used for 'E'. 'E' being 0 indicates that the corresponding RSRP is not available in the respective BFRQ MAC CE. 'E' being 1 indicates that the corresponding RSRP is available in the respective BFRQ MAC CE, for example, following the respective new candidate beam index.

In an embodiment, a BFRQ MAC CE format, such as one of the BFRQ MAC CE formats 610-613 can have a variable size. In an example, a BFRQ MAC CE format can include an ascending order based on, for example, serving cell indices, new beam indices, and/or the like. Thus, the new beam information and/or the beam measurement(s) can be arranged in the ascending order. Referring to FIGS. 6A-6D, i is less than j and j is less than k. In general, any suitable order can be used in a BFRQ MAC CE format. The order can be an ascending order, a descending order, or the like. The various fields in a BFRQ MAC CE format can be suitably modified, added, removed, combined, or the like for different scenarios.

In an embodiment, the electronic device 110 can be configured with a PCell (or a PSCell) having a cell index 0 and SCells having cell indices 1-31. In some examples, cell information of the PCell is excluded from a BFRQ MAC CE (e.g., 610A, 611A), such as shown in FIGS. 6a-6b. In some examples, the cell information of the PCell is included in a BFRQ MAC CE (e.g., 612A, 613A), such as shown in FIGS. 6C-6D.

Referring to FIG. 6A, the BFRQ MAC CE 610 includes fields C1-C31 for the SCells 1-31. 'R' 621 is reserved. In an example, beam failure of the SCells i, j, and k are detected and new candidate beams are identified for the SCells i, j, and k, respectively. i, j, k are integers larger than 0 and smaller than 32, and i, j, and k are in an ascending order where j is larger than i and smaller than k. Fields 'NBI' for serving cells (or the SCells) i, j, and k can include new candidate beam indices for the SCells i, j, and k, respectively. Fields 'E' 623-625 can indicate whether RSRPs follow the respective fields 'NBI' for the SCells i, j, and k. For example, when 'E' 623 is 1, the RSRP i follows the NBI for the SCell i. When 'E' 623 is 0, the RSRP i does not follow the NBI for the SCell i and can be excluded from the BFRQ MAC CE 610.

FIG. 6B includes identical fields as those in FIG. 6A except that fields 'E' and 'RSRP' are excluded. Beam measurements are excluded from the BFRQ MAC CE format 611. Thus, the BFRQ MAC CE format 611 is more compact than the BFRQ MAC CE format 610 and can save resources.

FIG. 6C includes identical fields as those in FIG. 6A except the following differences. 'R' 621 in FIG. 6a is replaced by a field $C_0$ in FIG. 6C for the PCell 0. In an example, C0 being 1 indicates beam failure in the PCell 0 and a NBI field is present in the BFRQ MAC CE 612. In addition, i is an integer larger than or equal to 0. In an example, partial beam failure is declared for the PCell 0, a BFRQ MAC CE having a same format as the BFRQ MAC CE format 612 can be used to indicate the partial beam failure. The BFRQ MAC CE can have a different logical channel ID (LCD). In an example, an additional field can be included in the BFRQ MAC CE format 612. The additional field can indicate the partial beam failure. In an example, a BFRQ MAC CE indicates the partial beam failure and includes RSRP(s). When a network (e.g., the network 101, the base station 120) receives the BFRQ MAC CE, the network can update a beam table previously reported by an electronic device (e.g., the electronic device 110) when the received RSRP(s) are larger than corresponding RSRP(s) in the beam table.

FIG. 6D includes identical fields as those in FIG. 6C except that fields 'E' and 'RSRP' are excluded. Beam measurements are excluded from the BFRQ MAC CE format 612. Thus, the BFRQ MAC CE format 613 is more compact than the BFRQ MAC CE format 612 and can save resources.

Figure 6E:
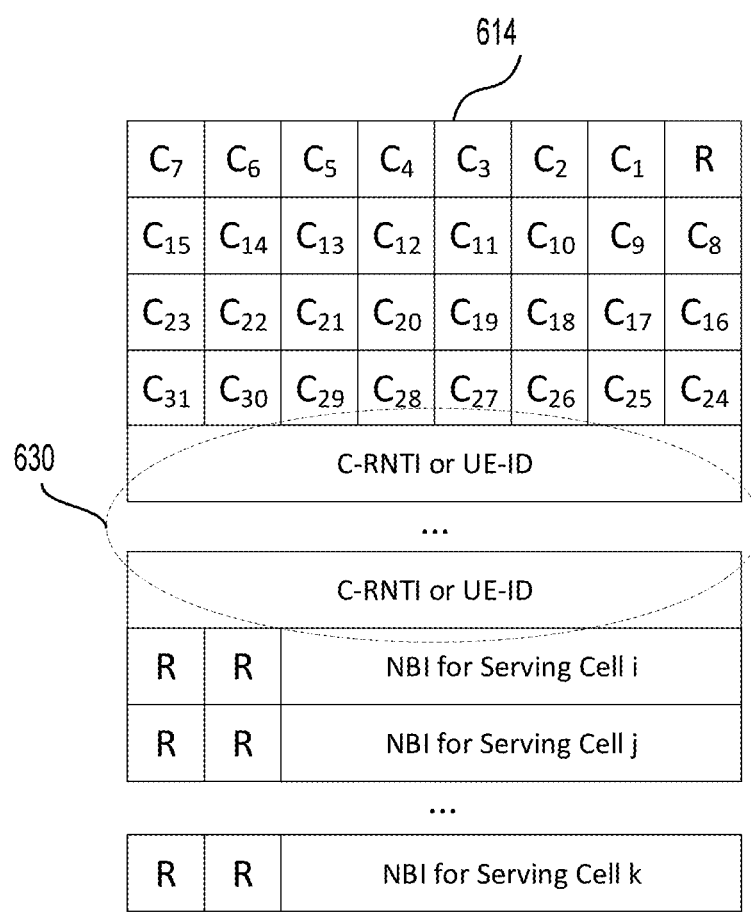

In an example, a device ID (e.g., a C-RNTI or a UE-ID) can be used in the CB first procedure, and thus can be merged into a BFRQ MAC CE, for example, to reduce an overhead. Accordingly, the BFRQ MAC CE formats 610-613 can be adapted to include additional fields, such as an ID field indicating device ID(s) (e.g., C-RNTI(s) or UE-ID(s)). FIG. 6E shows an example of a BFRQ MAC CE format 614 adapted from the BFRQ MAC CE format 611. Referring to FIGS. 6B and 6E, the BFRQ MAC CE format 614 includes an ID field 630. The ID field 630 can include C-RNTI(s) or UE-ID(s) of respective cell(s). The ID field 630 can be inserted between the fields '$C_N$' and 'NBI'. The ID field 630 can also be inserted into other suitable location in the BFRQ MAC CE format 614. Similarly, the BFRQ MAC CE formats 610, 612, and 613 can also be adapted to include the ID field. The detailed descriptions are omitted for purposes of brevity.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for beam failure recovery (BFR), comprising:
determining whether beam failure occurs on at least one of a plurality of cells configured for serving an electronic device; and
when the beam failure is determined to occur on the at least one of the plurality of cells, performing a 2-step random access procedure for BFR having a first step and a second step by
sending, in the first step, an uplink (UL) message that includes a first portion and a second portion to a network, and
receiving, in the second step, a downlink (DL) message from the network, the DL message indicating a BFR response, wherein
a first portion of the UL message indicates the beam failure and is transmitted using a physical random access channel (PRACH) resource, and
a second portion of the UL message indicates at least one of 1) cell information of the at least one of the plurality of cells and 2) new beam information of one or more new candidate beams for the at least one of the plurality of cells, and the second portion is transmitted using a physical uplink shared channel (PUSCH) resource.

2. The method according to claim 1, wherein
the second portion includes a BFR request (BFRQ) medium access control (MAC) control element (CE); and
sending the UL message includes:
sending the first portion using a PRACH preamble on the PRACH resource; and
sending the BFRQ MAC CE on the PUSCH resource.

3. The method according to claim 2, wherein
the cell information includes at least one cell index corresponding to the at least one of the plurality of cells;
the new beam information includes at least one new beam index of the one or more new candidate beams; and
the at least one of the plurality of cells includes an secondary cell (SCell), a primary secondary cell (PS-Cell), and/or a primary cell (PCell).

4. The method according to claim 2, further comprising:
randomly selecting the PRACH resource from a set of unreserved PRACH resources for the electronic device, the PUSCH resource being associated with the PRACH resource and unreserved, wherein
the 2-step random access procedure is a contention-based (CB) random access (CBRA) procedure.

5. The method according to claim 4, wherein
the UL message includes one or more data portions to be sent using the PUSCH resource;
the method includes determining a transmission order for the BFRQ MAC CE and the one or more data portions based on a priority rule for the UL message; and
sending the BFRQ MAC CE includes sending the BFRQ MAC CE using the PUSCH resource based on the transmission order.

6. The method according to claim 4, wherein
the second portion includes another BFRQ MAC CE; and
the method further includes sending the other BFRQ MAC CE on the PUSCH.

7. The method according to claim 4, wherein
the cell information includes at least one cell index corresponding to the at least one of the plurality of cells;
the new beam information includes at least one new beam index for the at least one of the plurality of cells; and
the BFRQ MAC CE further includes a device identification (ID) for the electronic device.

8. The method according to claim 2, further comprising:
receiving, from the network, a signal indicating the PRACH resource that is reserved for the electronic device, the PUSCH resource being associated with the PRACH resource and being reserved.

9. The method according to claim 2, wherein
the at least one of the plurality of cells includes multiple secondary cells (SCells) that share the PRACH resource and the PUSCH resource.

10. An apparatus for beam failure recovery (BFR), comprising:
processing circuitry configured to:
determine whether beam failure occurs on at least one of a plurality of cells configured for serving an electronic device; and when the beam failure is determined to occur on the at least one of the plurality of cells, perform a 2-step random access procedure for BFR having a first step and a second step by sending, in the first step, an uplink (UL) message that includes a first portion and a second portion to a network, and receiving, in the second step, a downlink (DL) message from the network, the DL message indicating a BFR response, wherein a first portion of the UL message indicates the beam failure and is transmitted using a physical random access channel (PRACH) resource, and a second portion of the UL message indicates at least one of 1) cell information of the at least one of the plurality of cells and 2) new beam information of one or more new candidate beams for the at least one of the plurality of cells, and the second portion is transmitted using a physical uplink shared channel (PUSCH) resource.

11. The apparatus according to claim 10, wherein
the second portion includes a BFR request (BFRQ) medium access control (MAC) control element (CE); and
the processing circuitry is configured to:
send the first portion using a PRACH preamble on the PRACH resource; and
send the BFRQ MAC CE on the PUSCH resource.

12. The apparatus according to claim 11, wherein
the cell information includes at least one cell index corresponding to the at least one of the plurality of cells;
the new beam information includes at least one new beam index of the one or more new candidate beams; and
the at least one of the plurality of cells includes an secondary cell (SCell), a primary secondary cell (PSCell), and/or a primary cell (PCell).

13. The apparatus according to claim 11, wherein
the 2-step random access procedure is a contention-based (CB) random access (CBRA) procedure; and
the processing circuitry is configured to:
randomly select the PRACH resource from a set of unreserved PRACH resources for the electronic device, the PUSCH resource being associated with the PRACH resource and unreserved.

14. The apparatus according to claim 13, wherein
the UL message includes one or more data portions to be sent using the PUSCH resource; and
the processing circuitry is configured to:
determine a transmission order for the BFRQ MAC CE and the one or more data portions based on a priority rule for the UL message; and
send the BFRQ MAC CE using the PUSCH resource based on the transmission order.

15. The apparatus according to claim 13, wherein
the second portion includes another BFRQ MAC CE; and
the processing circuitry is configured to send the other BFRQ MAC CE on the PUSCH.

16. The apparatus according to claim 13, wherein
the cell information includes at least one cell index corresponding to the at least one of the plurality of cells;
the new beam information includes at least one new beam index for the at least one of the plurality of cells; and
the BFRQ MAC CE further includes a device identification (ID) for the electronic device.

17. The apparatus according to claim 11, wherein the processing circuitry is configured to:
receive, from the network, a signal indicating the PRACH resource that is reserved for the electronic device, the PUSCH resource being associated with the PRACH resource and being reserved.

18. The apparatus according to claim 11, wherein
the at least one of the plurality of cells includes multiple secondary cells (SCells) that share the PRACH resource and the PUSCH resource.

* * * * *